United States Patent [19]
Clare

[11] Patent Number: 5,425,394
[45] Date of Patent: Jun. 20, 1995

[54] INTEGRAL CHECK, PRESSURE BALANCED, CONTROL VALVE

[75] Inventor: Manamohan Clare, Mississauga, Canada

[73] Assignee: Danfoss Manufacturing Company Limited, Canada

[21] Appl. No.: 107,160

[22] Filed: Aug. 17, 1993

[30] Foreign Application Priority Data

Aug. 26, 1992 [CA] Canada ................................. 2076924

[51] Int. Cl.⁶ ............................................. F16K 11/02
[52] U.S. Cl. ................................. 137/270; 137/100; 137/625.41; 137/605
[58] Field of Search ................... 137/270, 100, 625.41, 137/605

[56] References Cited

U.S. PATENT DOCUMENTS

| | | | |
|---|---|---|---|
| 2,758,610 | 8/1956 | Hively | 137/605 |
| 4,022,242 | 5/1977 | Turecek . | |
| 4,243,063 | 1/1981 | Parkinson | 137/100 |
| 4,516,607 | 5/1985 | Patient . | |
| 4,681,140 | 7/1987 | Hayman . | |
| 4,901,750 | 2/1990 | Nicklas et al. . | |

FOREIGN PATENT DOCUMENTS 1050853 of 1979 Canada .
0322597 3/1988 European Pat. Off. .
2178136 4/1987 United Kingdom .

*Primary Examiner*—Stephen M. Hepperle
*Assistant Examiner*—Kevin L. Lee
*Attorney, Agent, or Firm*—Jones, Tullar & Cooper

[57] ABSTRACT

The invention relates to a shower control valve assembly which includes a casing mountable in a wall with inlets for hot and cold water. A cartridge is insertable into the casing in one of two orientations so that the hot water inlet of the cartridge can be aligned with either one of the casing inlets, depending on which one is the hot water inlet. The casing has two outlets, one for the shower and the other for the tub. There is an integral bypass which takes water from the tub outlet to the shower outlet upon activation of a diverter valve. The cartridge is of the pressure and temperature balancing type, with water of the desired temperature flowing to the tub outlet and then to the tub or shower as desired. Each water inlet in the cartridge includes a check valve which, in one position allows water to enter the cartridge, and in the other position prevents water from leaving the cartridge through the inlet. This feature prevents cross flow of hot and cold water, prevents back flow into the supply pipes and, most significantly, prevents water hammer in the supply pipes.

8 Claims, 8 Drawing Sheets

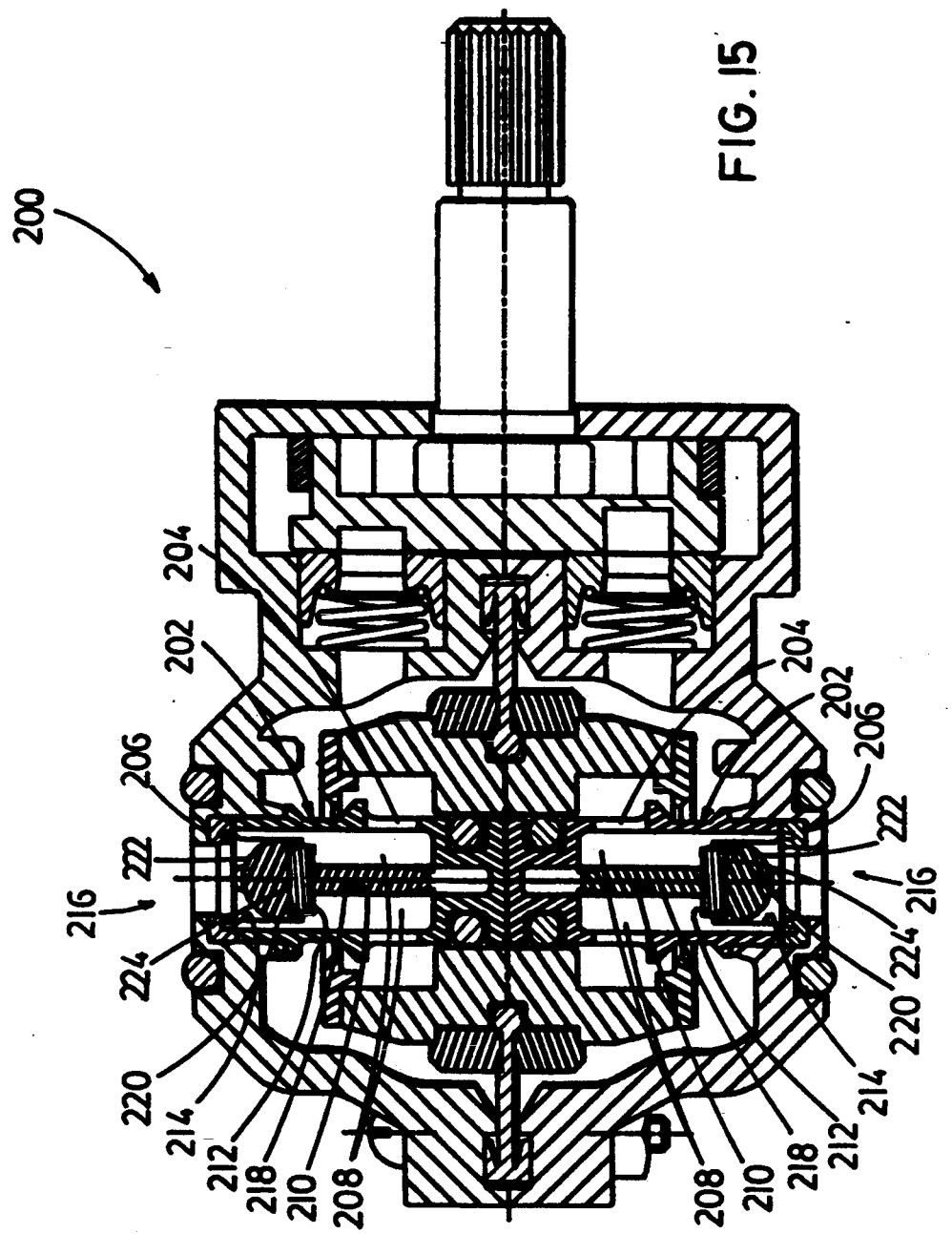

INTEGRAL CHECK, PRESSURE BALANCED, CONTROL VALVE

This invention relates to a new and improved shower control valve assembly.

BACKGROUND OF THE INVENTION

In the construction of residential and commercial buildings it is common to have back-to-back bathrooms wherein the hot and cold water supply pipes service shower and tub units on opposite sides of the wall. Prior art shower control valves often have the cold water inlet on one side and the hot water inlet on the other side. As the two supply pipes in the wall are normally side-by-side, it is necessary to provide an awkward cross-over arrangement for one of the shower units. Later inventions provided shower control valve assemblies that utilise a casing having two inlets and a replaceable cartridge unit which can be adjusted in a relatively simple manner at the time of installation so that it is entirely optional as to which of the inlets is connected to the hot water supply pipe and which is connected to the cold water pipe. Commonly assigned Canadian Patent No. 1,050,853 of Mar. 20, 1979 discloses just such an arrangement. The valve assembly of that patent is pressure balanced, with a single handle to control the temperature of the water issuing from the shower. The casing of the patented valve assembly included a single outlet leading to the shower, water for the tub flowing through a separate spout having a diverter valve associated therewith.

The trend in pressure balanced valve assemblies has been towards single handle control valves which are also adapted to control the flow of water to a tub as well as to a shower. U.S. Pat. Nos. 4,681,140; 4,901,750; and 4,905,732 all teach single handle pressure, temperature and/or volume balanced mixing valves.

One of the problems associated with any water flow arrangement is that of water hammer, generated noise which is frequently experienced in pressure sensing mixing valves when they are installed in line with quick closing faucets. Other problems involve cross flow between the hot and cold water supply lines and back flow in either or both of the supply lines.

SUMMARY OF THE INVENTION

The present invention overcomes the problems of the prior art by providing a single handle pressure balancing mixing valve assembly that includes, among other features, a check valve at each of the hot and cold water inlets to prevent cross flow between the hot and cold water supply lines; to prevent back flow to either supply line; and to eliminate the effects of water hammer. Additionally, or optionally, the valve casing may include separate outlets for the tub and for the shower, with there being a built-in bypass or diverter channel to divert water from one outlet to the other and the entire valve cartridge may be rotated through 180 degrees to reverse the hot and cold inlets.

Generally speaking the present invention may be defined as providing a shower control valve assembly comprising: a casing having; first and second water inlets and first and second water outlets therein; a cartridge shell insertable into the casing and having first and second separate inlet chambers in respective communication with the casing inlets; the inlet chambers being defined by an annular diaphragm member within the cartridge and a throttle valve unit centrally carried by the diaphragm; first and second flow tube members within the throttle valve unit and directed towards the respective casing inlets, each flow tube member having an open outer end and a closed inner end with outlet opening means adjacent the closed end thereof for passing water to a respective throttling portion of the throttle valve unit; means in each flow tube member defining a valve seat at the outer opening thereof; a check valve member in the flow tube member, adapted to move into and out of engagement with the valve seat to prevent or allow water flow through the flow tube member; wall means having first and second valve openings for the first and second chambers respectively; a mixing valve disk rotatably mounted in the cartridge in abutting engagement with the wall means; the casing having a discharge chamber on the side of the disk away from the inlet chambers and communicating with one of the water outlets; and the disk having first and second ports co-operable with the valve openings to pass water from one or both of the inlet chambers to the discharge chamber.

BRIEF DESCRIPTION OF THE DRAWINGS

FIGS. 14 and 15 are views similar to FIGS. 7 and 8 but illustrating a second embodiment cartridge.

DESCRIPTION OF THE PREFERRED EMBODIMENT

Figure 1:
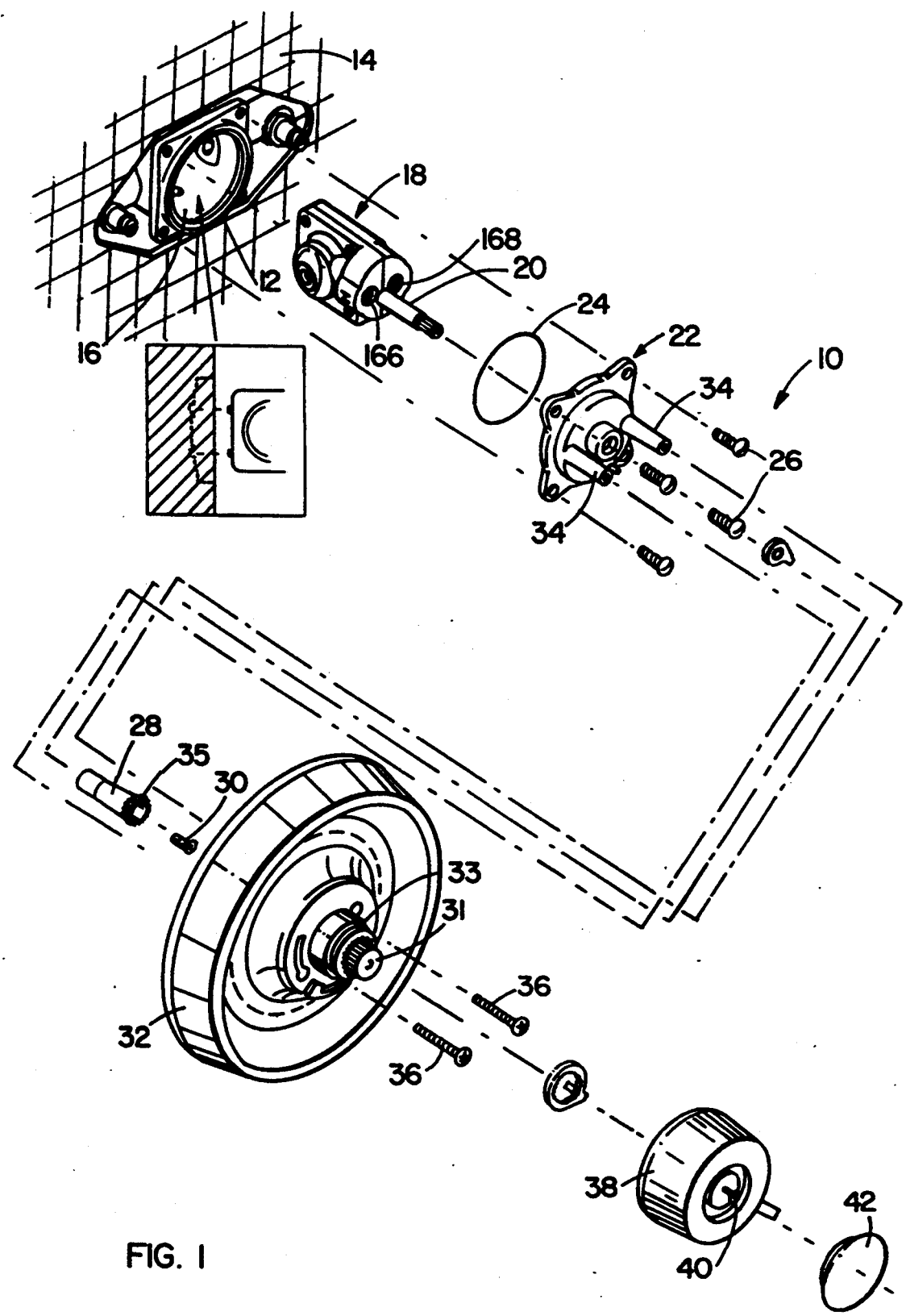
FIG. 1 is an exploded view of a shower mixing valve illustrating the main components of the invention.

Referring to FIG. 1 there is shown an exploded assembly view of the shower valve 10 of the present invention. A casing 12 is mounted in the wall 14 of the shower and is connected to the hot and cold water pipes (not shown), one being connected to the casing on each side thereof. The casing is also connected to outlet pipes (not shown) which lead to the shower head and to the tub faucet. The casing 12 has a central opening 16 which receives a mixing cartridge 18 to be described in greater detail hereinafter.

A cartridge 18 has a pinion shaft 20 extending therefrom and a cover 22, with sealing ring 24 interposed, is assembled to the casing 12 via machine screws 26. A driver 28 is attached to the pinion shaft 20 by a machine screw 30. An intermediate handle 31 is attached to an escutcheon plate 32 by a lock ring 33. The escutcheon plate covers the opening in the shower wall and is attached to elongated bosses 34 on the cover 22 by machine screws 36. Internal splines on the intermediate handle 31 engage external splines 35 on the driver 28. A control knob 38 is attached to the intermediate handle 31 by a machine screw 40 and has a removable cover 42 to hide the screw 40 from view.

Figure 2:
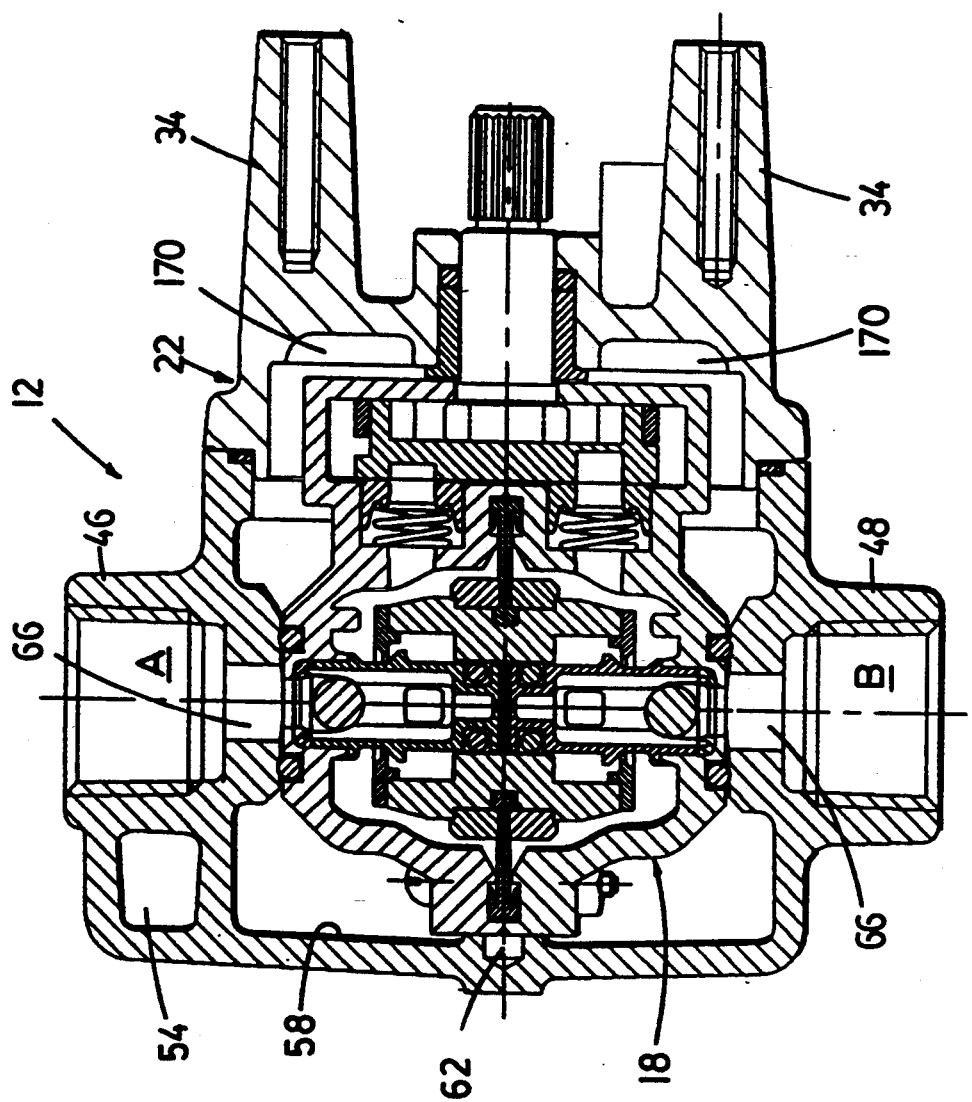
FIG. 2 is a sectional view on a horizontal plane of the casing with a first embodiment cartridge installed therein.
Figure 3:
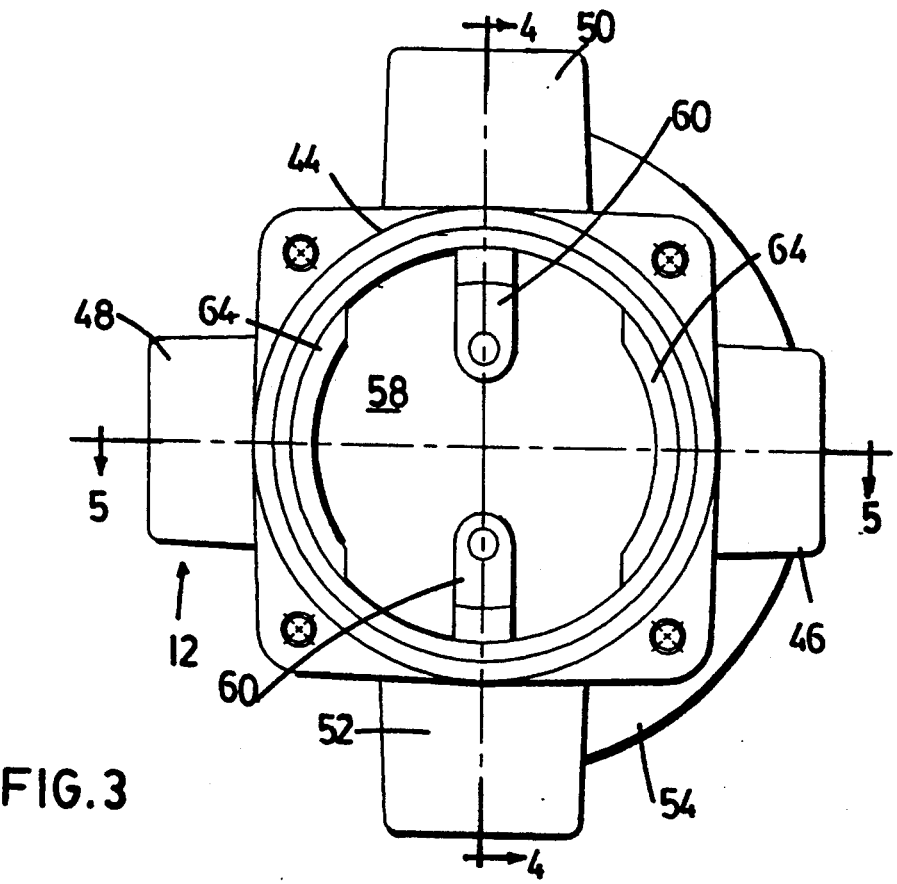
FIG. 3 is a front view of the casing with the cover thereof removed.
Figure 4:
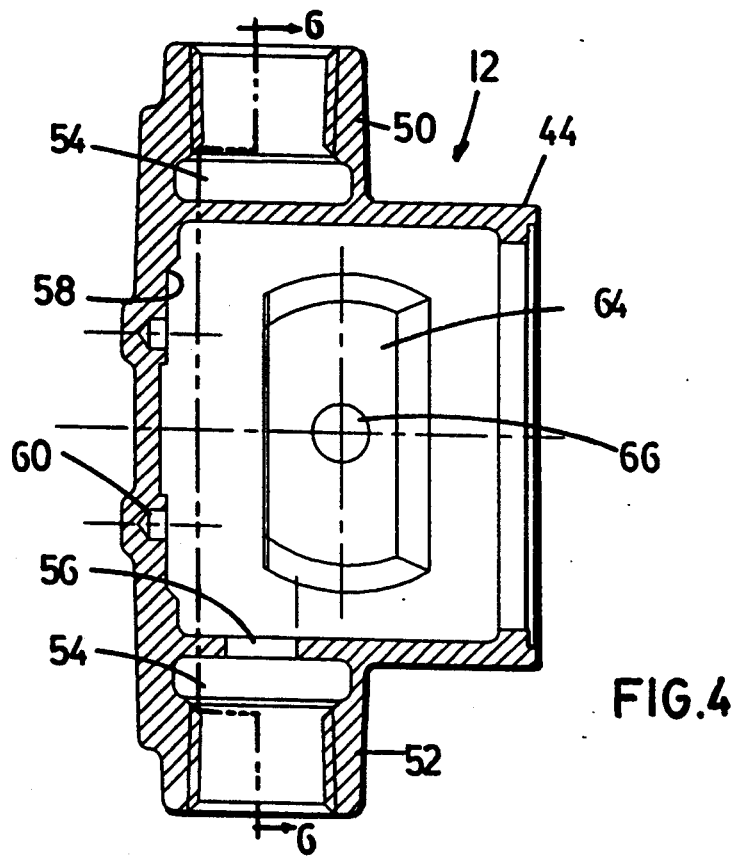
FIG. 4 is a sectional view of the casing on the line 4—4 of FIG. 3.
Figure 5:
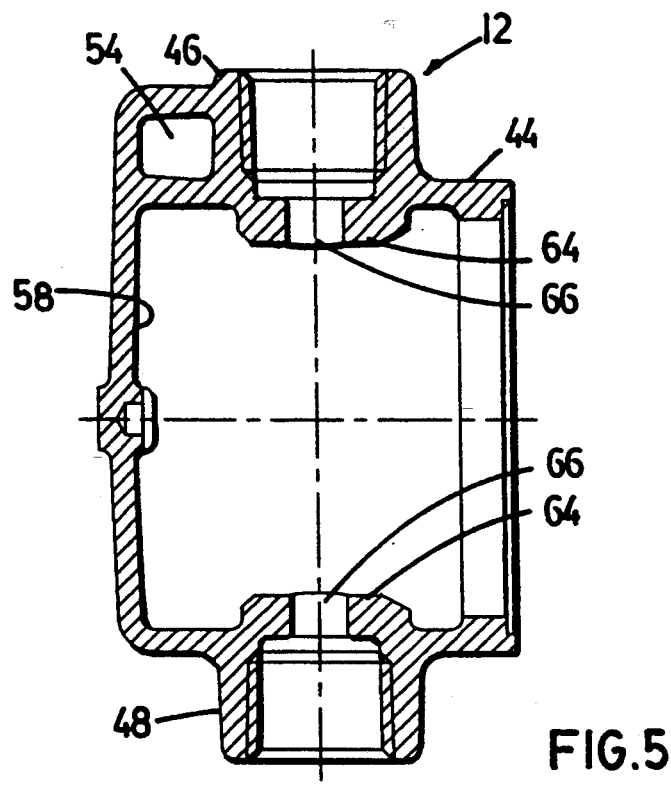
FIG. 5 is a sectional view of the casing on the line 5—5 of FIG. 3.
Figure 6:
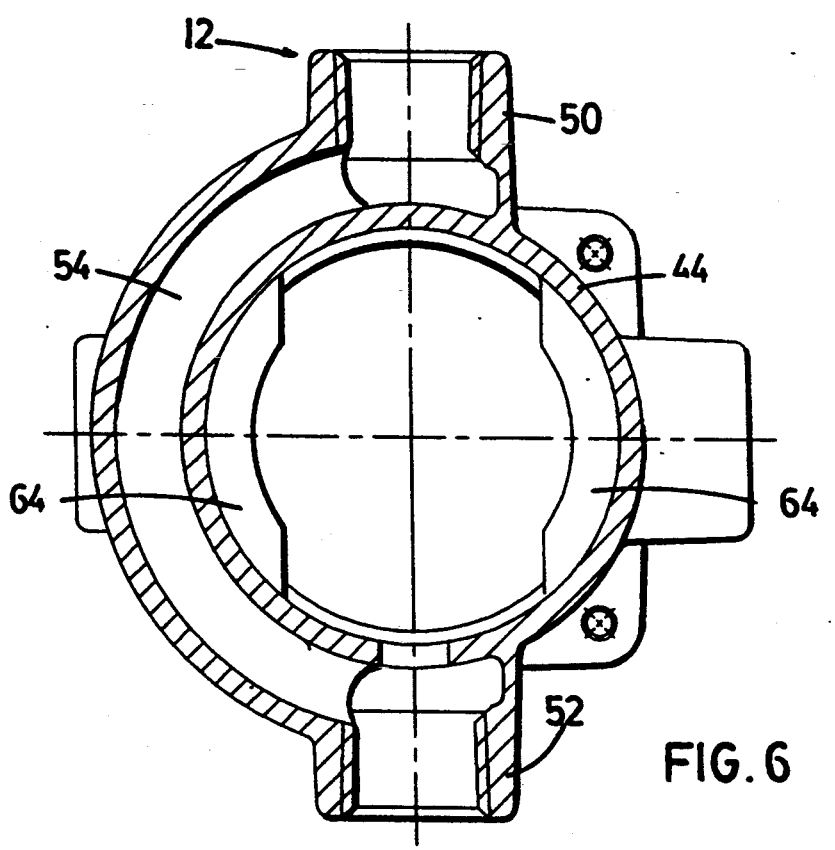
FIG. 6 is a sectional view of the casing on the line 6—6 of FIG. 4.

With reference to FIGS. 1 and 2, the casing 12 is normally mounted between the studs of a bathroom wall and, in the case of back-to-back installations in which there is a shower stall on each side of the wall, the hot and cold water supply pipes indicated by the letters A and B may be interchanged. With the present invention it is simply a matter of positioning the cartridge in one of two possible orientations so as to permit the supply A to be either hot or cold with the other supply being the opposite temperature.

The casing 12 is best seen in FIGS. 3 to 6. The casing is cast from brass and has a generally cylindrical section 44 with the optionally reversible hot and cold water inlets 46 and 48 on opposite sides thereof. Opposite discharge outlets 50 and 52 are provided, with the outlet 50 leading to the shower head and the outlet 52 leading to the tub faucet. A bypass 54 is integrally cast into the casing, interconnecting the outlets 50 and 52. Normally, outlet water will flow to the tub outlet 52 through an opening 56 in the casing wall. However, when the shower is to be used a separate diverter valve (not shown), below the outlet 52, will be activated to prevent water flowing through the outlet 52 and thereby forcing it through the bypass 54 to the shower outlet 50.

The closed, circular rear wall 58 of the casing 212 has a pair of elongated bosses 60 therein, which bosses include recesses 60A to receive appropriate projections 62 on the rear of the cartridge, for positively locating the cartridge in the casing in either of its desired orientations. Arcuate bosses 64 on the inner side walls of the casing are provided for sealing engagement with cartridge inlets and each has an opening 66 therethrough for passage of the inlet water to the interior of the casing.

Figure 7:
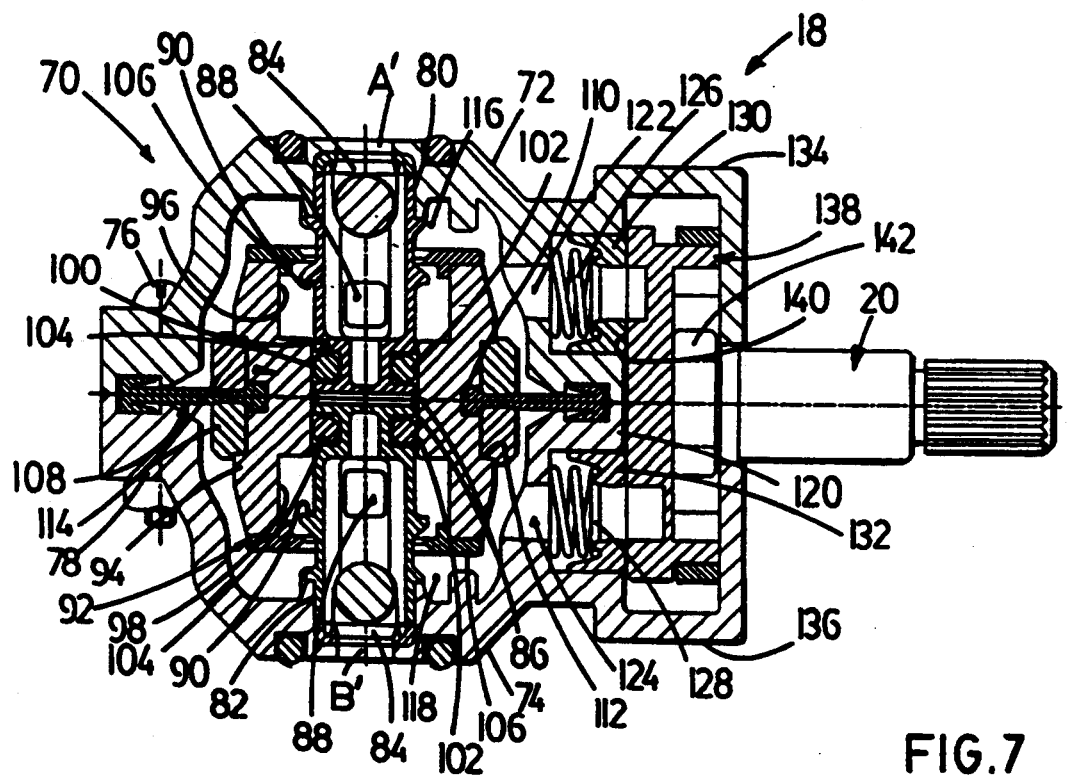
FIG. 7 is an enlarged sectional view of the first embodiment cartridge, similar to that of FIG. 2, the check valves being open.

FIG. 7 is a view from the top of a first replaceable cartridge unit 18 which is insertable into the casing 12. The cartridge has a shell 70 which comprises two halves 72 and 74 which may be joined together with nut and bolt means 76 or by rivets. The cartridge shell has a vertically and generally rectangularly shaped protuberance 78 which carries the projections 62 which fit into the casing recesses 60 when the cartridge 18 is inserted into the casing in either orientation.

Cartridge 18 is generally symmetrical relative to a central vertical plane. The letters A' and B' in FIG. 7 correspond to the letters A and B of FIG. 2 and represent hot and cold water inlets with either one being the hot water inlet and the other being the cold water inlet. The inlets A' and B' of the cartridge 18 are, when the cartridge is inserted, aligned with the casing inlets 46 and 48.

Tube members 80 and 82 are aligned with casing inlets 46 and 48 and are fixedly attached to the shell sections 72 and 74 respectively. Each tube member has an open outer end 84, a closed inner end 86 and egress openings 88 adjacent the inner end. Additionally, there is an annular collar 90 on the exterior of the tube member which constitutes a fixed seat co-operable with a throttle valve unit 92 to be described below.

The throttle valve unit referred to and described herein functions to maintain substantially constant water outlet temperature by compensating for relative changes in pressure of the hot and cold water supplied to the unit. The throttle valve unit shown in the drawings is similar in many respects to that shown in Canadian Patent No. 1,050,853 although there are improvements associated with the present unit.

The throttle valve unit 92 includes an integrally moulded, generally cylindrical member 94 having large diameter counterbores 96, 98 extending thereinto from opposite ends. A central through bore 100 communicates the counterbore 96 with the counterbore 98, has an inside diameter nominally the same as the outside diameter of the tube members 80 and 82, and receives the abutting closed inner ends 86 of the tube members 80 and 82. An annular recess 102 in each tube member receives an O-ring 104 for sealing engagement with the bore 100. As there is a slip fit between the bore 100 and the tube members 80 and 82 the cylindrical member 94 is able to move relative to the stationary tube members 80 and 82.

A separate annular outer lip member 106 is fixed to the outer rim of each counterbore 96, 98 and cooperates with the collar 90 on the adjacent tube members 80, 82 in a manner to throttle the flow of water egressing from the openings 88. The axial movement of the cylindrical member 94 is such that an increase in the throttling of water flowing out of one set of openings 88 is accompanied by a decrease in the throttling of water flowing out of the other set of openings 88, and vice versa.

The throttle valve unit 92 also includes an annularly shaped diaphragm 108 made of a resilient material (rubber) which has its outer periphery attached between the cartridge shell halves 72 and 74. The inner periphery of the diaphragm is received in a circumferential recess 110 within a wider recess 112 of the cylindrical member 94. A pair of retainer members 114 act as clamping rings to hold the inner end of the diaphragm within the recess 110. The inner end of the diaphragm is movable with the cylindrical member and the diaphragm separates the interior of the cartridge shell into first and second interior chambers 116 and 118.

In operation, an increase in pressure on one side, such as in the tube member 80, reacts on the diaphragm 108 to move the cylindrical member 94 in a direction such that an increase in throttling occurs between the opposite collar 90 and throttling lip member 106.

Referring to the right side of FIG. 7 the shell halves 72, 74 are formed with a wall member 120 having two cylindrically shaped recesses 122 and 124 having the shape of counterbores to facilitate the flow of a liquid therethrough and retaining therein coil springs 126 and 128. Ring-shaped glands 130 and 132 are also respectively disposed in the recesses 122 and 124 and are in engagement with the respective coil springs 126 and 128.

Extending to the right of cartridge wall member 120 are casing portions 134 and 136 which form an annular ring portion. Within this ring portion, and in abutting engagement with the wall member 120, is a disk valve member 138. With reference as well to FIGS. 9 to 13 it will be seen that the disk member 138 is generally cylindrical in form, that it has an inner flat surface 140, and a generally annular recess 142 in the opposite outer surface.

Formed within the wall of the recess 142, and extending over about 200° is a plurality of gear teeth 144. These teeth are engageable by the corresponding mating teeth 146 of a pinion gear 148 mounted to the inner end of the pinion shaft 20. Rotation of the pinion gear 148 by the pinion shaft 20 will result in rotation of the disk valve member 138.

A first generally arcuate port 150 extends through the inner wall of the member 138, the port 150 having arcuate edges 152, 154, a radial end wall 156, and an off-radial end wall 158. This port serves the hot water flow through the member 138. Generally opposite the port 150 is a second port 160 which has a much different shape and serves the cold water flow through the member 138. The port 160 includes a small rounded "D"-shaped opening 162 through the inner wall of the member 138 and an arcuate transition wall portion 164 that curves inwardly from the inner surface 140 to the opening 162.

The openings 150 and 160 lead to the recess 142 within the disk valve member 138. A pair of holes 166 and 168 in the end wall of the cartridge (see FIG. 1) lead to a discharge or mixing chamber 170 defined by the inner surface of the cover 22 and the portion of the casing 12 not occupied by the cartridge (FIG. 2). The mixing chamber leads, in turn, to the outlet opening 56 that leads to the tub outlet 52. Rotation of the pinion shaft 20 rotates the pinion gear 148 to rotate the disk valve member 138 and thus bring, progressively, one or the other of the openings 150, 160 into greater registry with the adjacent counterbore 122, or 124 to increase the flow of cold or hot water into the mixing chamber and hence to the tub (or shower) outlet.

Figure 8:
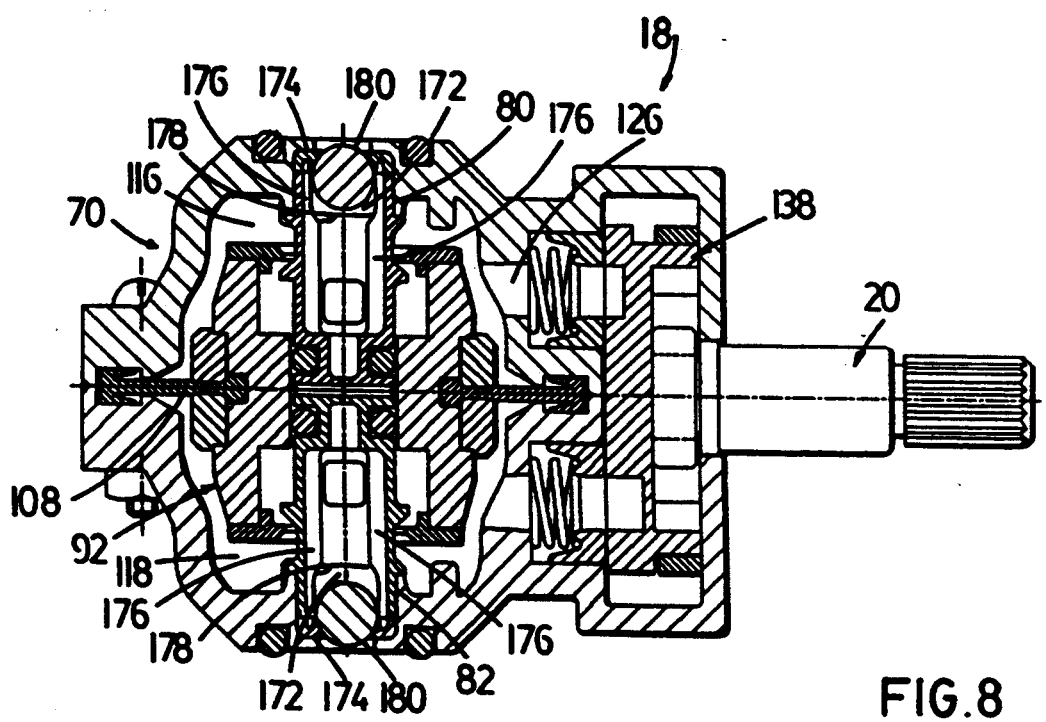
FIG. 8 is the same as FIG. 7 except that the check valves are closed.
Figure 9:
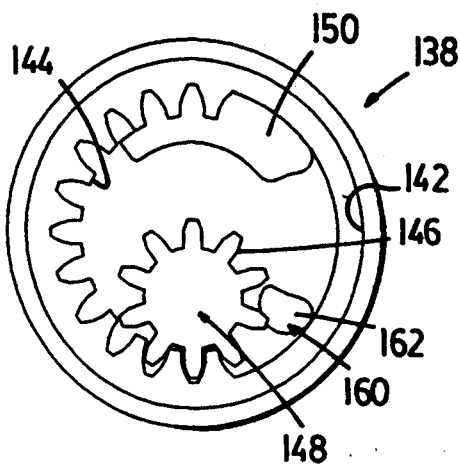
FIGS. 9 and 11 are front views of the valve disc with and without the pinion gear in place respectively.
Figure 10:
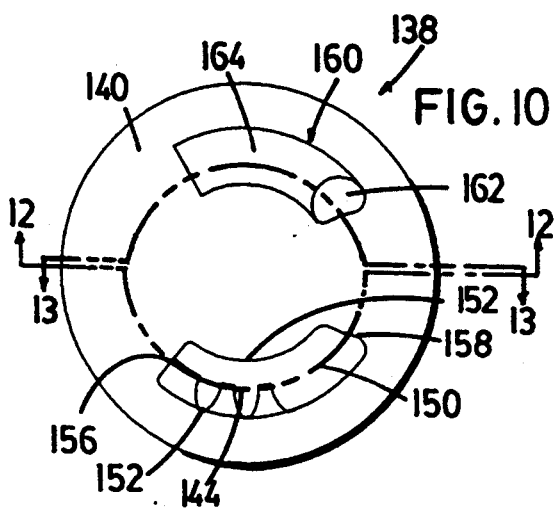
FIG. 10 is a rear view of the valve disc.
Figure 11:
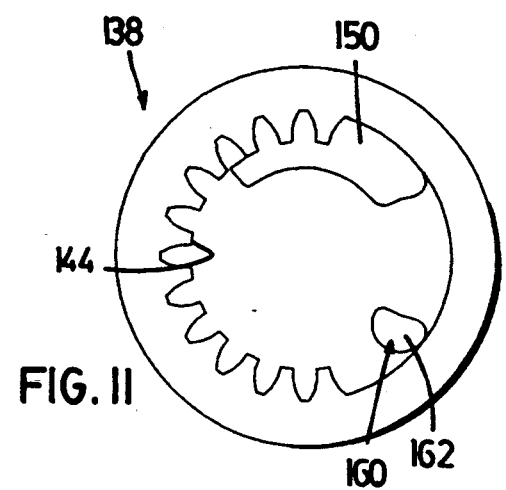
Figure 12:
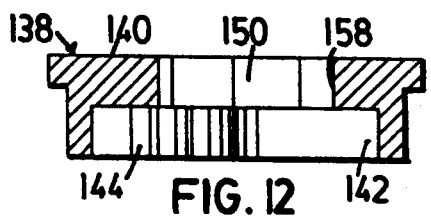
FIGS. 12 and 13 are sectional views of the valve disc on the lines 12—12 and 13—13 respectively.
Figure 13:
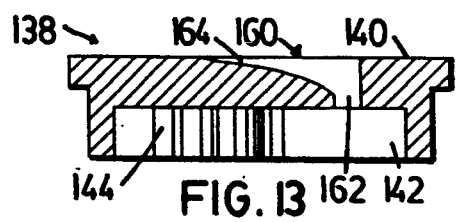

FIGS. 2, 7 and 8 illustrate a major improvement of the present invention over known prior art mixing valves. With particular reference to FIG. 8 it is seen that each of the tube members 80, 82 has a short passageway 172 extending inwardly from the outer end thereof, there being a resilient sealing lip 174 around the periphery of the robe member and extending radially inwardly by a small amount, the sealing lip defining a valve seat. The passageway 172 is actually formed by a plurality of circumferentially spaced and inwardly extending splines 176, which splines have a slightly angled or curved shoulder 178 spaced inwardly from the sealing lip 174. Contained within the passageway is a spherical plastic check valve member 180, which member can move between limits defined by the shoulder 178 and the sealing lip 174. When water is flowing into the mixing valve of the invention each plastic valve member 180 is forced inwardly of its passageway 172 to abut the shoulder 178 so that water can flow past the member 180 along the splines 176. This is shown in FIGS. 2 and 7. On the other hand, when water is not flowing into the valve there likely will still be water within the valve, under a degree of pressure, which pressure will move each valve member 180 outwardly against the sealing lip 174, thereby preventing water flow from the inlet chambers back to the supply pipes. In this simple manner the invention prevents the occurrence of water hammer, cross flow between the hot and cold supply pipes, and back flow to the supply pipes.

Figure 14:
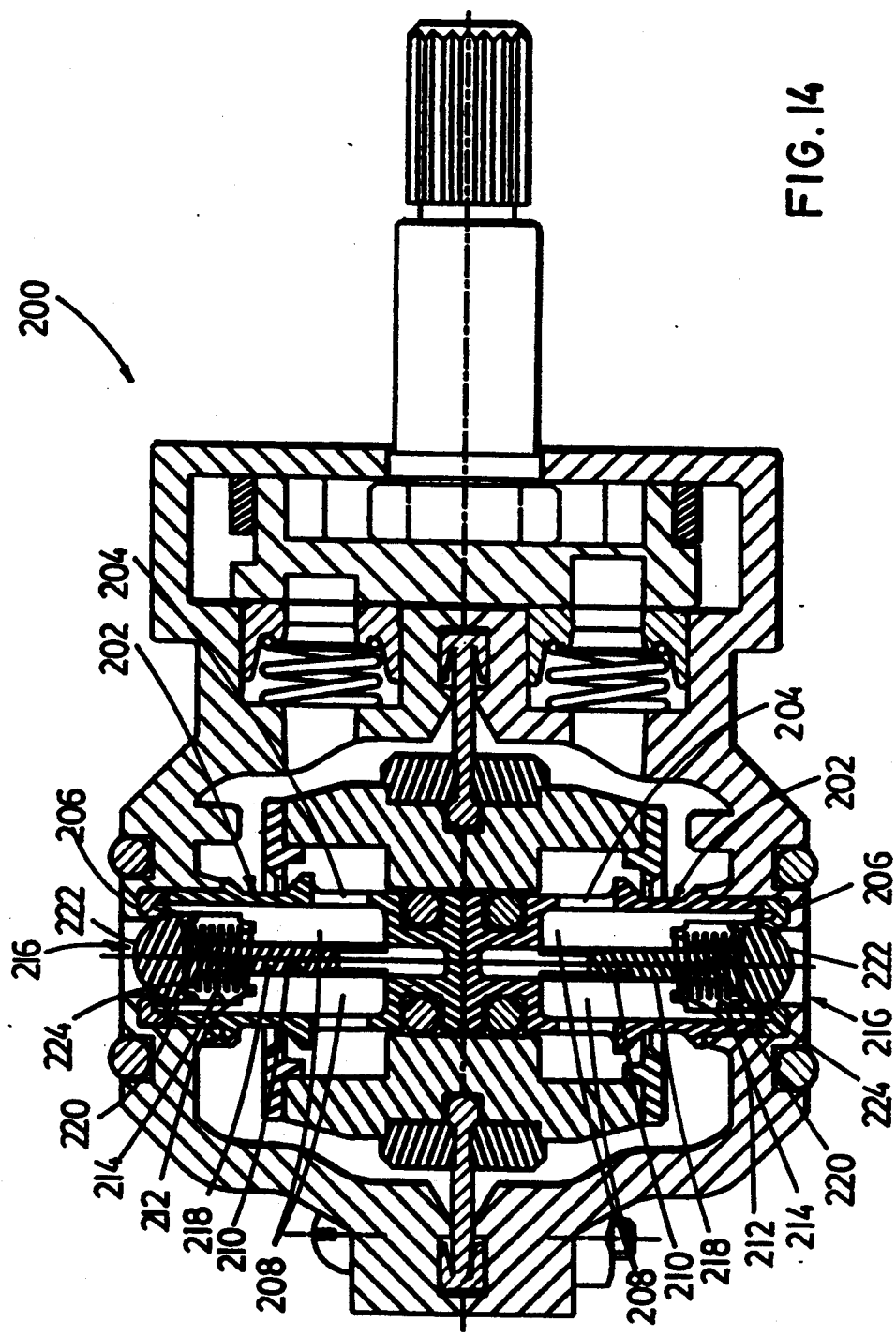

A second embodiment of the cartridge unit is illustrated in FIGS. 14 and 15 and carries the reference number 200. The majority of the components of the cartridge 200 are identical to those found in cartridge 18 and need not be described again. The main difference between the cartridges 18 and 200 lies in the check valves themselves and the flow tube members in which they reside.

In the cartridge 200 each flow tube member 202 has an unrestricted inner bore with the openings 204 being provided adjacent the closed end thereof for passage of water from the flow tube member eventually to the mixing chamber. The open outer end of the flow tube member has a sealing lip 206 therearound, forming a valve seat as in the first embodiment.

A plurality of circumferentially spaced, radially directed splines 208 reside in the tube member 202, the inner end thereof defining a small diameter, "bore" 210 and terminating, short of the outer end the tube member 202 in an annular shoulder 212. The spline continue to the outer end of the tube member, defining a large diameter outer "bore" 214. A plastic poppet 216 has cylindrical tail portion 218 that extends into the bore 210, a cylindrical portion 220 that rides in the bore 214, and a semi-spherical end portion 222. A compression spring 224 is provided within the outer bore 214, with one end of the spring abutting the annular shoulder 212 and the other end thereof abutting the underside of the cylindrical portion 220 of the poppet valve 216.

The second embodiment cartridge operates in the same manner as the first embodiment cartridge. When water is flowing into the cartridge the poppets 216 are forced inwardly of their respective flow tube members 202 by the water pressure, against the restoring force of the compression springs 224. Water can flow to the mixing chamber for subsequent delivery to the tub or shower as described above. When water is not flowing into the flow tube members the internal water pressure and the compression springs 224 move the poppers towards the valve seats formed by the sealing lips 206. The compression springs 224 augment the force applied by the water pressure to ensure that the poppets do not move out of sealing engagement with their respective valve seats.

The cartridge of the present invention is completely self-contained in that the pinion gear and the pinion shaft are an integral part of the cartridge as presented to the installation expert. He need only orient the cartridge one way or the other to have the hot water coming into the hot water side of the cartridge, thereby compensating for installation situations in which the hot and cold water supplies are positioned opposite to what might be expected. Furthermore, by providing an integral bypass between the tub and shower outlets in association with a built-in diverter valve it is not necessary to provide additional plumbing, a considerable expense in time and supplies. Finally, by providing the check valve members within the cartridge, many of the operating problems associated with these mixing valves have been eliminated.

Two embodiments of the present invention have been described herein. However, it is understood that a skilled practitioner could alter the specifics of the design without departing from the principles of the invention. Thus, the protection to be afforded this invention is to be determined from the claims appended hereto.

I claim:

1. A shower control valve assembly comprising: a casing having first and second water inlets and first and second water outlets therein; a cartridge shell insertable into said casing and having first and second separate inlet chambers in respective communication with said casing inlets; said inlet chambers being defined by an annular diaphragm member within said cartridge and a throttle valve unit centrally carried by said diaphragm; first and second flow tube members within said throttle valve unit and directed towards the respective casing inlets, each flow tube member having an open outer end and a closed inner end with outlet opening means adjacent the closed end thereof for passing water to a respective throttling portion of said throttle valve unit; means in each flow tube member defining a valve seat at the outer open end thereof; a check valve member in said flow tube member, adapted to move into and out of engagement with said valve seat to prevent or allow water flow into said flow tube member; wall means having first and second valve openings to the first and second chambers respectively; a mixing valve disk rotatably mounted in said cartridge in abutting engagement with said wall means; the casing having a discharge chamber on the side of said disk away from said inlet chambers and communicating with one of said water outlets; and said disk having first and second ports co-operable with the valve openings to pass water from one or both of said inlet chambers to said discharge chamber.

2. The control valve assembly of claim 1 wherein each said flow tube member includes a short passageway extending inwardly from said valve seat, said passageway being defined by a plurality of circumferentially spaced apart splines extending into the tube member from the outer end thereof, said splines defining a shoulder spaced inwardly from said outer end; and said valve seat comprising a sealing lip member at the outer end of the tube member, said check valve member being spherical and being movable between outer and inner limits as defined by said sealing lip member and said shoulder.

3. The control valve assembly of claim 1 including, for each tube member, a plurality of circumferentially spaced apart radial splines extending therealong, inner portions of the splines defining a small diameter inner bore and terminating short of said valve seat at an annular shoulder, outer portions of the splines defining a larger diameter outer bore; and a compression spring member positioned between said annular shoulder and said check valve member; said check valve member having a cylindrical tail portion within said inner bore, a cylindrical portion within said outer bore and connected to said tail portion, and a hemispherical outer end portion for engagement with said valve seat.

4. The control valve of claim 1 including a bypass integral with said casing and extending from said one of the water outlets to the other of the water outlets.

5. The control valve of claim 1 wherein one of said first and second ports in said valve disk is generally arcuate in form and the other of said ports has a "D"-shaped opening through the valve disk and an arcuate transition wall portion curving inwardly from a rear surface of the valve disk to the "D"-shaped opening.

6. A replaceable cartridge for a shower control valve assembly having a casing with first and second water inlets, first and second water outlets, and a discharge chamber communicating with one of the water outlets, said cartridge comprising: a shell insertable into said casing and having first and second separate inlet chambers for respective communication with said casing inlets; said inlet chambers being defined by an annular diaphragm member within said shell and a throttle valve unit centrally carried by said diaphragm; first and second flow tube members within said throttle valve unit, each flow tube member having an open outer end and a closed inner end with outlet opening means adjacent the closed end for passing water to a respective throttling portion of said throttle valve unit; means in each flow tube member defining a valve seat at the open outer end thereof; a check valve member in each flow tube member, adapted to move into and out of engagement with said valve seat to prevent or allow water flow through said flow tube member; wall means having first and second valve openings to the first and second chambers respectively; and a mixing valve disk rotatably mounted in said cartridge in abutting engagement with said wall means, said disk having first and second ports co-operable with the valve openings to pass water from one or both of said inlet chambers to the casing discharge chamber.

7. The cartridge of claim 6 wherein each said flow tube member includes a short passageway extending inwardly from said valve seat, said passageway being defined by a plurality of circumferentially spaced apart splines extending into the tube member from the outer end thereof, said splines defining a shoulder spaced inwardly from said outer end; and said valve seat comprising a sealing lip member at the outer end of the tube member, said check valve member being spherical and being movable between outer and inner limits as defined by said sealing lip member and said shoulder.

8. The cartridge of claim 6 including, for each tube member, a plurality of circumferentially spaced apart radial splines extending therealong, inner portions of the splines defining a small diameter inner bore and terminating short of said valve seat at an annular shoulder, outer portions of the splines; defining a large diameter outer bore; and a compression spring member, positioned between said annular shoulder and said check valve member; said check valve member having a cylindrical tail portion within said inner bore, a cylindrical portion within said outer bore and connected to said tail portion, and a hemispherical outer end portion for engagement with said valve seat.

* * * * *